United States Patent
Xu et al.

(10) Patent No.: US 11,256,943 B2
(45) Date of Patent: Feb. 22, 2022

(54) METHOD AND APPARATUS FOR VERIFYING IDENTITY DOCUMENT, ELECTRONIC DEVICE, AND STORAGE MEDIUM

(71) Applicant: SHENZHEN SENSETIME TECHNOLOGY CO., LTD., Shenzhen (CN)

(72) Inventors: Miaoran Xu, Shenzhen (CN); Zhongfu Zhang, Shenzhen (CN); Zhonghua She, Shenzhen (CN); Xubo Xiang, Shenzhen (CN); Kun Ma, Shenzhen (CN); Wenchao Zhou, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 500 days.

(21) Appl. No.: 16/314,414

(22) PCT Filed: Sep. 29, 2018

(86) PCT No.: PCT/CN2018/108896
§ 371 (c)(1),
(2) Date: Dec. 29, 2018

(87) PCT Pub. No.: WO2019/114376
PCT Pub. Date: Jun. 20, 2019

(65) Prior Publication Data
US 2021/0232843 A1 Jul. 29, 2021

(30) Foreign Application Priority Data
Dec. 14, 2017 (CN) .......................... 201711341981.6

(51) Int. Cl.
*G06K 9/00* (2006.01)
*G06K 9/20* (2006.01)

(52) U.S. Cl.
CPC ....... *G06K 9/2063* (2013.01); *G06K 9/00288* (2013.01); *G06K 9/00463* (2013.01); *G06K 9/00469* (2013.01); *G06K 2209/01* (2013.01)

(58) Field of Classification Search
CPC ...... G06K 9/18; G06K 9/00215; G06K 9/228; G06K 9/03; G06K 9/6407; G06K 9/2009;
(Continued)

(56) References Cited

U.S. PATENT DOCUMENTS 7,995,196 B1 * 8/2011 Fraser ................ G06K 9/00288
356/71
8,332,401 B2 * 12/2012 Hull .................... G06K 9/00463
707/736
(Continued)

FOREIGN PATENT DOCUMENTS

CN 1731414 A 2/2006
CN 102004909 A 4/2011
(Continued)

OTHER PUBLICATIONS

International Search Report in the international application No. PCT/CN2018/108896, dated Dec. 28, 2018.
(Continued)

*Primary Examiner* — Amir Alavi
(74) *Attorney, Agent, or Firm* — Syncoda LLC; Feng Ma

(57) ABSTRACT

A method and an apparatus for verifying an identity document, an electronic device, and a storage medium include: collecting an identity document image of a current identity document by means of a first camera; recognizing characters in the identity document image to obtain first identity document data; obtaining second identity document data of the identity document by means of an identity document
(Continued)

reader; and verifying authenticity of the identity document according to the first identity document data and the second identity document data.

18 Claims, 5 Drawing Sheets

(58) Field of Classification Search
CPC .. G06K 9/6423; G06K 9/38; G06K 19/06037; G06K 9/2063; G06K 9/00288; G06K 9/00463; G06K 9/00469; G06T 7/001
See application file for complete search history.

(56) References Cited

U.S. PATENT DOCUMENTS

| | | | | |
|---|---|---|---|---|
| 8,634,066 | B1* | 1/2014 | Fraser | G06K 9/00577 356/71 |
| 9,247,136 | B2* | 1/2016 | Emmett | G06K 9/228 |
| 9,280,696 | B1* | 3/2016 | Fraser | G06K 9/18 |
| 9,361,497 | B1* | 6/2016 | Torzilli | G06K 9/32 |
| 9,594,993 | B2* | 3/2017 | Picard | G06K 7/1434 |
| 9,594,994 | B2* | 3/2017 | Biro | G06K 19/06037 |
| 9,747,473 | B2* | 8/2017 | Decoux | G06K 19/06028 |
| 10,581,843 | B2* | 3/2020 | Potash | G06K 19/06103 |
| 10,979,421 | B2* | 4/2021 | Yang | G06K 19/06037 |
| 2003/0219145 | A1 | 11/2003 | Smith | |
| 2005/0077351 | A1 | 4/2005 | De Jong | |
| 2006/0157559 | A1 | 7/2006 | Levy | |
| 2015/0332082 | A1* | 11/2015 | King | B42D 25/00 382/116 |
| 2015/0347839 | A1 | 12/2015 | Hagen | |
| 2016/0125231 | A1 | 5/2016 | Stoyanov et al. | |
| 2017/0255800 | A1 | 9/2017 | Hagen | |
| 2019/0354736 | A1 | 11/2019 | Hagen | |

FOREIGN PATENT DOCUMENTS

| | | |
|---|---|---|
| CN | 102034099 A | 4/2011 |
| CN | 201804359 U | 4/2011 |
| CN | 204302992 U | 4/2015 |
| CN | 104636765 A | 5/2015 |
| CN | 105844206 A | 8/2016 |
| CN | 106127659 A | 11/2016 |
| CN | 106982426 A | 7/2017 |
| CN | 108229457 A | 6/2018 |
| EP | 1947605 A2 | 7/2008 |
| JP | 2001086319 A | 3/2001 |
| JP | 2003242455 A | 8/2003 |
| JP | 2005242778 A | 9/2005 |
| JP | 2007065118 A | 3/2007 |
| JP | 2007172605 A | 7/2007 |
| JP | 2010204829 A | 9/2010 |
| JP | 2017033477 A | 2/2017 |
| KR | 20040052963 A | 6/2004 |
| TW | 201528211 A | 7/2015 |
| TW | 201714109 A | 4/2017 |
| WO | 2017123098 A1 | 7/2017 |

OTHER PUBLICATIONS

First Office Action of the Chinese application No. 201711341981.6, dated Mar. 13, 2019.
First Office Action of the European application No. 18888667.5, dated Aug. 20, 2020.
Supplementary European Search Report in the European application No. 18888667.5, dated Feb. 3, 2020.
First Office Action of the Japanese application No. 2019-564440, dated Dec. 22, 2020.

* cited by examiner

METHOD AND APPARATUS FOR VERIFYING IDENTITY DOCUMENT, ELECTRONIC DEVICE, AND STORAGE MEDIUM

CROSS-REFERENCE TO RELATED APPLICATION

The present disclosure claims priority to Chinese Patent Application No. 201711341981.6 filed on Dec. 14, 2017, the disclosure of which is hereby incorporated by reference in its entirety.

TECHNICAL FIELD

Embodiments of the present disclosure relate to the technical field of image processing, and in particular, to a method and an apparatus for verifying an identity document, an electronic device, and a storage medium.

BACKGROUND

Identity recognition and verification for a target person are involved in many fields, such as security, business administration and finance. Usually, scanning the identity card of a target person and entering identity information are required. Sometimes, verifying a target person by his/her the identity card can be involved.

In general, identity card information is read from a chip in the identity card by means of an identity card reader. However, the identity of a person could be faked by placing the chip in the identity card of a first person into the identity card of a second person who is about to have the fake identity, and then tampering information on the surface of the identity card of the second person as fake personal information.

Therefore, criminals may have opportunities in a scenario where identity card information is merely read by using an identity card reader without being subjected to any identity card information verification.

SUMMARY

Embodiments of the present disclosure provide technical solutions of identity document verification.

According to a first aspect of the embodiments of the present disclosure, a method for verifying an identity document is provided, which includes: collecting an identity document image of a current identity document by means of a first camera; recognizing characters in the identity document image to obtain first identity document data; obtaining second identity document data of the identity document by means of an identity document reader; and verifying authenticity of the identity document according to the first identity document data and the second identity document data.

According to a second aspect of the embodiments of the present disclosure, an apparatus for verifying an identity document is provided, which includes: an image collection module, configured to collect an identity document image of a current identity document by means of a first camera; a character recognition module, configured to recognize characters in the identity document image to obtain first identity document data; a data obtaining module, configured to obtain second identity document data of the identity document by means of an identity document reader; and a data verification module, configured to verify authenticity of the identity document according to the first identity document data and the second identity document data.

According to a third aspect of the embodiments of the present disclosure, an electronic device is provided, which includes: a processor and a memory, where the memory is configured to store at least one executable instruction and the executable instruction enables the processor to execute the method for verifying an identity document according to the first aspect.

According to a fourth aspect of the embodiments of the present disclosure, a computer readable storage medium is provided, which stores: an executable instruction configured to collect an identity document image of a current identity document by means of a first camera; an executable instruction configured to recognize characters in the identity document image to obtain first identity document data; an executable instruction configured to obtain second identity document data of the identity document by means of an identity document reader; and an executable instruction configured to verify authenticity of the identity document according to the first identity document data and the second identity document data.

According to a fifth aspect of the embodiments of the present disclosure, a computer program product is provided, which includes: at least one executable instruction, which is configured to implement the method for verifying an identity document according to any one item in the first aspect when the executable instruction is executed by a processor.

According to the embodiments of the present disclosure, during verification on the identity document of the target user, the first identity document data and the second identity document data are separately obtained, where the first identity document data is obtained by collecting an identity document image of the current identity document by means of the first camera and recognizing the characters in the identity document image; and the second identity document data is obtained by means of the identity document reader. Furthermore, authenticity of the identity document of the target user is verified according to the first identity document data and the second identity document data. According to the embodiments of the present disclosure, during verification on the identity document of the target user, by combining the first identity document data obtained by means of character recognition and the second identity document data read from a chip of the identity document, whether personal information stored in the chip of the identity document is consistent with personal information displayed on the surface of the identity document can be verified, so that the situation of faking information on the surface of an identity document or faking information in a chip of an identity document may be avoided, thereby improving accuracy and applicability of identity document verification.

DETAILED DESCRIPTION

Figure 1:
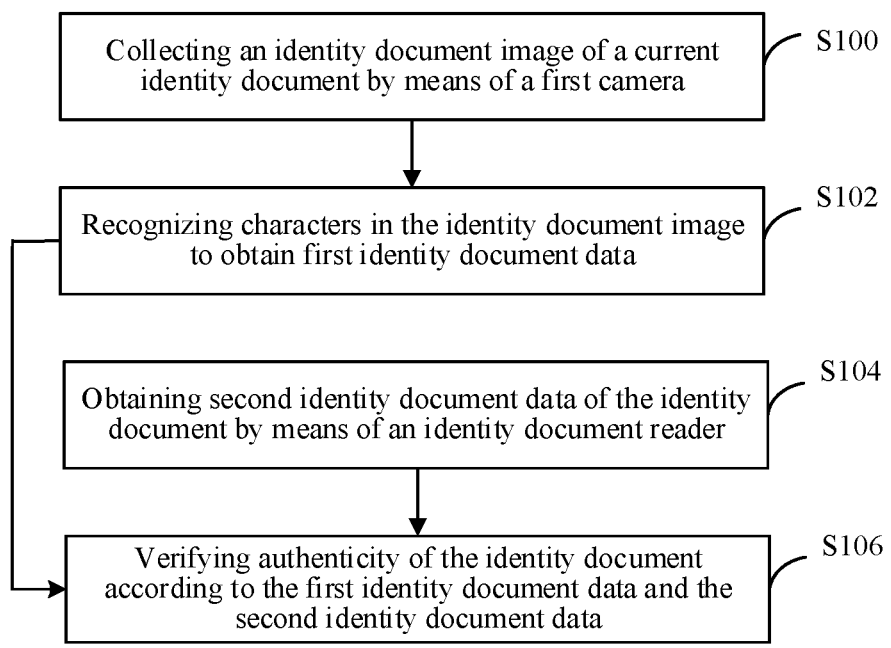
FIG. 1 is a flow chart of a method for verifying an identity document according to embodiment I of the present disclosure.

The implementation modes of the embodiments of the present disclosure are further described in detail below with reference to the accompanying drawings (the same reference numerals in a plurality of accompanying drawings represent the same elements) and the embodiments. The following embodiments are intended to illustrate the technical solutions in the embodiments of the present disclosure, but are not intended to limit the scope of protection of the present disclosure.

Persons skilled in the art can understand that the terms "first", "second" and the like in the embodiments of the present disclosure are only used to distinguish different steps, devices or modules, etc., and do not represent any specific technical meaning or inevitable logical sequence therebetween.

Embodiment I

FIG. 1 illustrates a flow chart of a method for verifying an identity document according to embodiment I of the present disclosure.

The method for verifying an identity document according to this embodiment of the present disclosure invokes, by means of a processor of an electronic device, related instructions stored in a memory to execute the steps below.

Step S100, an identity document image of a current identity document is collected by means of a first camera.

The identity document in this embodiment of the present disclosure includes, but not limited to: an identity card, an employee's card, a membership card, and the like. No matter what type of identity documents, the following two points are required to be fulfilled: I. personal information of an owner (such as the name) of an identity document and/or related information of the identity document (such as the certifying authority and validity of the identity document) are provided on a surface of the identity document; and II. the identity document includes a chip or a readable storage medium containing the personal information of the owner and/or the related information of the identity document.

In this embodiment of the present disclosure, the identity document image may be obtained by photographing any surface of the current identity document by means of the first camera. The identity document image in this embodiment of the present disclosure may be a video frame image, may be an image frame from a video sequence of an image collection device, may also be an independent frame of image or an independent image, or may further be derived from other devices. Because an identity document usually includes a front surface and a back surface and each surface may display data, the front surface and/or the back surface of the current identity document may be photographed by means of the first camera, and moreover, when data of the front surface and/or the back surface is required to be used for comparison, a user may be prompted to turn the current identity document over to allow the first camera to collect the front surface image and/or the back surface image of the current identity document.

Step S102, characters in the identity document image are recognized to obtain first identity document data.

In general, the personal information and/or the identity document related information on the identity document are printed and displayed in order, so that an appropriate character recognition method, for example, an Optical Character Recognition (OCR) method, may be used to perform recognition on the identity document image to obtain the first identity document data.

It should be noted that the identity document image in this embodiment of the present disclosure may be an image of any surface of the current identity document, for example, an image of the front surface or an image of the back surface, where the front surface and the back surface are relative and may be determined according to actual conditions of the surfaces of the identity document, and this is not limited in this embodiment of the present disclosure.

S104, second identity document data of the identity document is obtained by means of an identity document reader.

In this embodiment of the present disclosure, a chip reader and the like may be used to perform a reading operation on the chip in the identity document to obtain the second identity document data of the identity document, and the technical means for obtaining the second identity document data by using the identity document reader is not limited in this embodiment of the present disclosure.

Step S106, authenticity of the identity document is verified according to the first identity document data and the second identity document data.

In this embodiment of the present disclosure, the first identity document data obtained by means of character recognition (e.g., OCR) and the second identity document data read from the chip may be combined to verify the authenticity of the identity document in two aspects, i.e., the data displayed on the surface of the identity document and the data stored in the identity document.

It should be noted that the execution process of obtaining the first identity document data and the execution process of obtaining the second identity document data in this embodiment of the present disclosure may be concurrently performed, or be performed in sequence; moreover, when the execution processes are performed in sequence, the first identity document data may be obtained first and then the second identity document data is obtained, or the second identity document data may be obtained first and then the first identity document data is obtained. The relationship between time nodes for obtaining the first identity document data and the second identity document data is not limited in this embodiment of the present disclosure. A numerical relationship among the steps S100, S102, and S104 should not be understood as a limitation on the execution sequence of the steps.

According to this embodiments of the present disclosure, during verification on the identity document of the target user, the first identity document data and the second identity document data are separately obtained, where the first identity document data is obtained by collecting an identity document image of the current identity document by means of the first camera and recognizing the characters in the identity document image; and the second identity document data is obtained by means of the identity document reader. Furthermore, the authenticity of the identity document of the target user is verified according to the first identity document data and the second identity document data. According to this embodiment of the present disclosure, during verification on the identity document of the target user, by combining the first identity document data obtained by means of character recognition and the second identity document data read from the chip of the identity document, whether personal information stored in the chip of the identity document is consistent with personal information displayed on a surface of the identity document may be verified, so that the situation of faking information on a surface of an identity document or faking information in a chip of an identity document may be avoided, thereby improving accuracy and applicability of identity document verification.

Embodiment II

Figure 2:
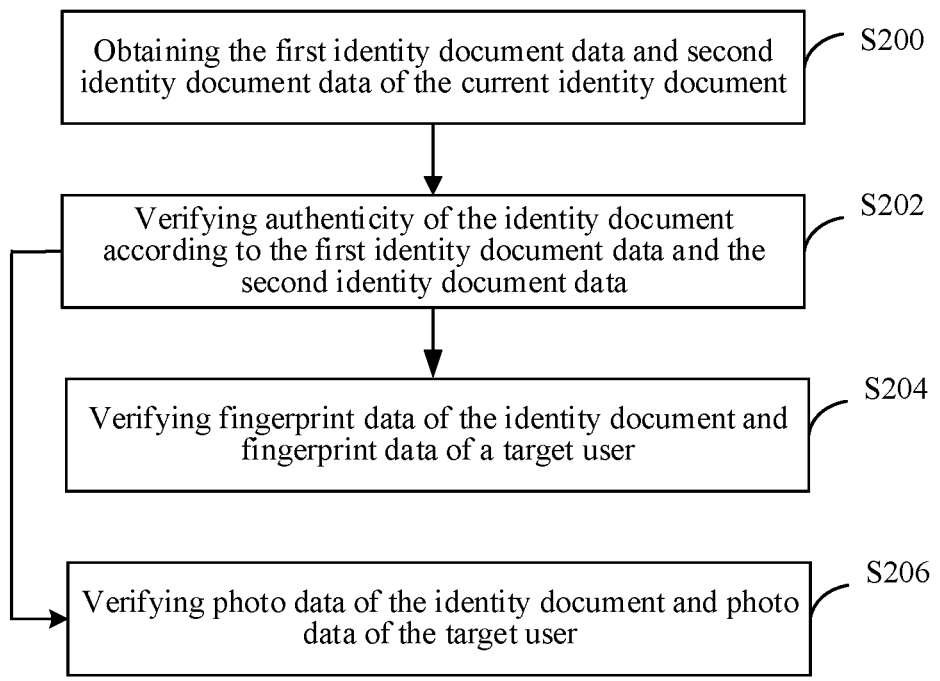
FIG. 2 is a flow chart of a method for verifying an identity document according to embodiment II of the present disclosure.

FIG. 2 illustrates a flow chart of a method for verifying an identity document according to embodiment II of the present disclosure.

It should be noted that description portions of the embodiments of the present disclosure all have their own focuses, and for details that are not described exhaustively in one embodiment, refer to the introduction and description in other embodiments in the present disclosure. Details are not described herein again.

Step S200, first identity document data and second identity document data of a current identity document are obtained.

In this embodiment of the present disclosure, the first identity document data may be considered to be identity document data obtained from a surface of the identity document, and the second identity document may be considered to be identity document data obtained from a storage medium (e.g., a chip) of the identity document. How to obtain the first identity document and the second identity document are introduced separately below.

I. The First Identity Document Data of the Identity Document is Obtained.

The first identity document data is obtained by obtaining an identity document image of the identity document by means of an image collection device and recognizing characters in the identity document image. During the process of obtaining the identity document image, position information and orientation information of the identity document may be obtained, and whether a photographing condition for the identity document is satisfied is determined according to the position information and the orientation information; and if the photographing condition is satisfied, the image collection device is used to photograph the identity document to obtain the identity document image. The position information of the identity document may be considered as position information of the identity document within an image collection range of the image collection device, for example, distance information between the identity document and the image collection device, and distance information between the identity document and an edge of the image collection range. The content of the position information is not limited in this embodiment of the present disclosure. The orientation information of the identity document is used for indicating which surface of the identity document faces the image collection device, for example, the surface displaying personal information on the identity document faces the image collection device and the other surface displaying identity document related information on the identity document faces away from the image collection device. The content of the orientation information is not limited in this embodiment of the present disclosure.

In an optional implementation mode, when whether the photographing condition for the identity document is satisfied is determined according to the position information and the orientation information, whether a body of the identity document is completely located within a preset area may be determined according to the position information and whether a target surface of the identity document faces towards a first direction may be determined according to the orientation information. The preset area may be considered to be a photographing area of the image collection device or an area with optimal or relatively good photographing effect. The target surface may be considered to be the identity document surface including data to be compared, and the first direction may be considered to be a direction along which the target surface faces the image collection device, or a direction from the preset area to the image collection device. If the body of the identity document is completely located within the preset area and the target surface faces towards the first direction, it may be determined that the photographing condition for the identity document is satisfied; and if the body of the identity document is completely located outside the preset area, a part of the body of the identity document is located outside the preset area, or the target surface faces towards a second direction, it may be determined that the photographing condition for the identity document is not satisfied, where the first direction is different from the second direction.

In other embodiments, if the photographing condition for the identity document is not satisfied, prompt information for indicating an adjustment of the identity document is generated and presented, where the prompt information may be presented in forms such as a static image, a dynamic image, voice, and light; for example, if the body of the identity document is completely located outside the preset area, an edge of the preset area may be highlighted and a user may be prompted by a sound to adjust the placement position of the identity document.

In this embodiment of the present disclosure, the first identity document data at least includes one of the following data: name, gender, nationality, date of birth, residential address, citizen identification number, photo data, issuing authority information, validity period of the identity document, or the like.

II. The Second Identity Document Data of the Identity Document is Obtained.

The second identity document data may be obtained by using a chip reader to read the chip of the identity document.

In this embodiment of the present disclosure, the second identity document data at least includes one of the following data: name, gender, nationality, date of birth, residential address, citizen identification number, photo data, issuing authority information, validity period of the identity document, or the like.

Step S202, authenticity of the identity document is verified according to the first identity document data and the second identity document data.

In other embodiments, comparison is performed on corresponding data in the first identity document data and the second identity document data, and if the corresponding data in the first identity document data and the second identity document data are identical, the identity document is determined to be true; and if at least one corresponding data between the first identity document data and the second identity document data is different, the identity document is determined to be false. The corresponding data is data indicating the same item of personal information or identity document related information, for example, the name in the first identity document data and the name in the second identity document data are corresponding data, and the citizen identification number in the first identity document data and the citizen identification number in the second identity document data are corresponding data.

For example, the first identity document data includes name, gender, nationality, data of birth, residential address and citizen identification number, and the second identity document data includes name, gender, nationality, data of birth, residential address and citizen identification number. If the name in the first identity document data is identical to the name in the second identity document data, the gender in the first identity document data is identical to the gender in the second identity document data, the nationality in the first identity document data is identical to the nationality in the second identity document data, the data of birth in the first identity document data is identical to the data of birth in the second identity document data, the residential address in the first identity document data is identical to the residential address in the second identity document data, and the citizen identification number in the first identity document data is identical to the citizen identification number in the second identity document data, the identity document is true. If the name in the first identity document data is identical to the name in the second identity document data, the gender in the first identity document data is identical to the gender in the second identity document data, the nationality in the first identity document data is identical to the nationality in the second identity document data, the data of birth in the first identity document data is identical to the data of birth in the second identity document data, the residential address in the first identity document data is identical to the residential address in the second identity document data, and the citizen identification number in the first identity document data is different from the citizen identification number in the second identity document data, the identity document is false. That is to say, the identity document is determined to be false as long as one corresponding data in the corresponding data between the first identity document data and the second identity document data is different. Moreover, corresponding data is required for each in the data of the first identity document data and each in the data of the second identity document data.

In other embodiments, when the identity document is determined to be false, the different data content in the corresponding data between the first identity document data and the second identity document data may be presented. In the case of the foregoing example, the citizen identification number in the first identity document data and the citizen identification number in the second identity document data are displayed in a highlighted mode. The presenting form for the different corresponding data is not limited in this embodiment of the present disclosure.

If a verification result that the identity document is true is obtained after the authenticity verification operation on the identity document in step S202, the following steps may be further performed.

Step S204, fingerprint data of the identity document and fingerprint data of the target user are verified.

In an optional implementation mode, the fingerprint data of the target user is obtained by using a fingerprint obtaining device, and is compared with the fingerprint data in the second identity document data; if the fingerprint data of the target user is identical to the fingerprint data in the second identity document data, the identity document is determined to be matched with the target user; and if the fingerprint data of the target user is different from the fingerprint data in the second identity document data, the identity document is not determined to be matched with the target user.

Step S206, photo data of the identity document and photo data of the target user are verified.

In an optional implementation mode, a user image of the target user is obtained by using an image collection device; photo data of the target user is obtained by performing facial recognition on the user image; the photo data of the target user is separately compared with photo data in the first identity document data and photo data in the second identity document data; if the photo data of the target user is identical to both the photo data in the first identity document data and the photo data in the second identity document data, the identity document is determined to be matched with the target user; and if the photo data of the target user is different from both the photo data in the first identity document data and the photo data in the second identity document data, the identity document is not determined to be matched with the target user. The image collection device for obtaining the user image and the image collection device for obtaining the identity document image may be the same device, or different devices, which is not limited in this embodiment of the present disclosure. Facial recognition may be performed on the user image by using technical means such as a convolutional neural network, and the technical means used for facial recognition is not limited in this embodiment of the present disclosure.

The photo data in this embodiment of the present disclosure may be biological characteristic data such as facial characteristic data and iris characteristic data, and data types of the photo data are not limited in this embodiment of the present disclosure.

It should be noted that the steps S204 and S206 may both be executed, or be executed alternatively, and moreover, the execution sequence of the steps S204 and S206 are not limited.

On the basis of the foregoing description of the embodiment of the present disclosure, the method for verifying an identity document is described by taking verifying an identity card using an identity recognition device as an example. The identity recognition device includes an identity card reader, an identity card photographing camera, a supplementary light, a display, a loudspeaker and the like. The verification process is as follows: reading chip data of the identity card by using an identity card reader, meanwhile starting the identity card photographing camera and the supplementary light, determining whether the identity card is placed within a specified area and the personal information page faces upwards, and if the identity card is placed within the specified area and the personal information page faces upwards, photographing the personal information page of the identity card by means of the identity card photographing camera; and if the identity card is not placed within the specified area or the personal information page does not faces upwards, providing a prompt by means of a display screen and the loudspeaker to adjust the placement position and orientation of the identity card. OCR is performed on a photo on the personal information page to obtain personal information data of the identity card, the chip data and the personal information data are compared, and if corresponding data between the chip data and the personal information data are identical, a facial verification operation and a fingerprint verification operation for the target user are further executed; if there is a difference in the corresponding data between the chip data and the personal information data, data content of the different item of corresponding data is displayed on the display screen.

According to this embodiments of the present disclosure, during verification on the identity document of the target user, the first identity document data and the second identity document data are separately obtained, where the first identity document data is obtained by collecting an identity document image of the current identity document by means of the first camera and recognizing the characters in the identity document image; and the second identity document data is obtained by means of the identity document reader. Furthermore, the authenticity of the identity document of the target user is verified according to the first identity document data and the second identity document data. According to this embodiment of the present disclosure, during verification on the identity document of the target user, by combining the first identity document data obtained by means of character recognition and the second identity document data read from the chip of the identity document, whether personal information stored in the chip of the identity document is consistent with personal information displayed on a surface of the identity document may be verified, so that the situation of faking information on a surface of an identity document or faking information in a chip of an identity document may be avoided, thereby improving accuracy and applicability of identity document verification.

According to this embodiment of the present disclosure, the first identity document data and the second identity document data may include the biological characteristic data such as the facial characteristic data and the fingerprint data. After the identity document is verified to be true, whether the identity document is matched with the user of the identity document is further verified by using the facial characteristic data and/or the fingerprint data, thereby enhancing the application depth and breadth of the identity document verification.

Embodiment III

Figure 3:
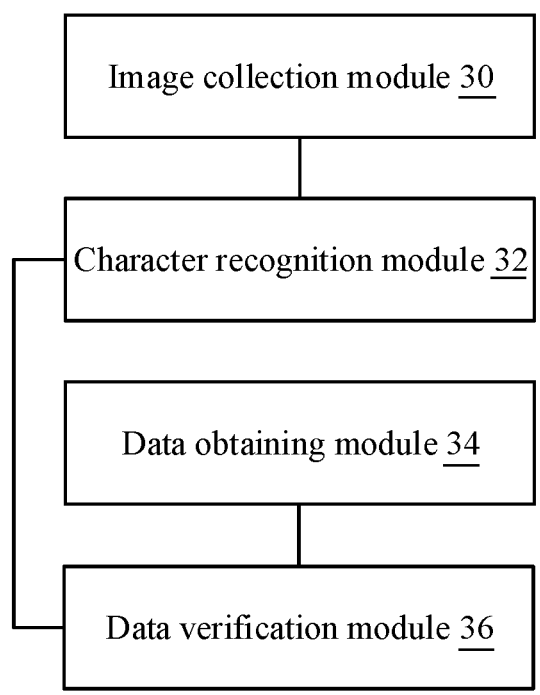
FIG. 3 is a structure block diagram of an apparatus for verifying an identity document according to embodiment III of the present disclosure.

FIG. 3 illustrates a structure block diagram of an apparatus for verifying an identity document according to embodiment III of the present disclosure.

The apparatus for verifying an identity document according to this embodiment of the present disclosure includes: an image collection module 30, configured to collect an identity document image of a current identity document by means of a first camera; a character recognition module 32, configured to recognize characters in the identity document image to obtain first identity document data; a data obtaining module 34, configured to obtain second identity document data of the identity document by means of an identity document reader; and a data verification module 36, configured to verify authenticity of the identity document according to the first identity document data and the second identity document data.

The first camera and the identity document reader in the embodiment of the present disclosure may be disposed within the apparatus for verifying an identity document, or may be configured as independent third-party devices, which is not limited in this embodiment of the present disclosure.

The apparatus for verifying an identity document according to this embodiment of the present disclosure is configured to implement the method for verifying an identity document according to the forgoing embodiments, and yields the corresponding effective effect of the method embodiments. Details are not described herein again.

Embodiment IV

Figure 4:
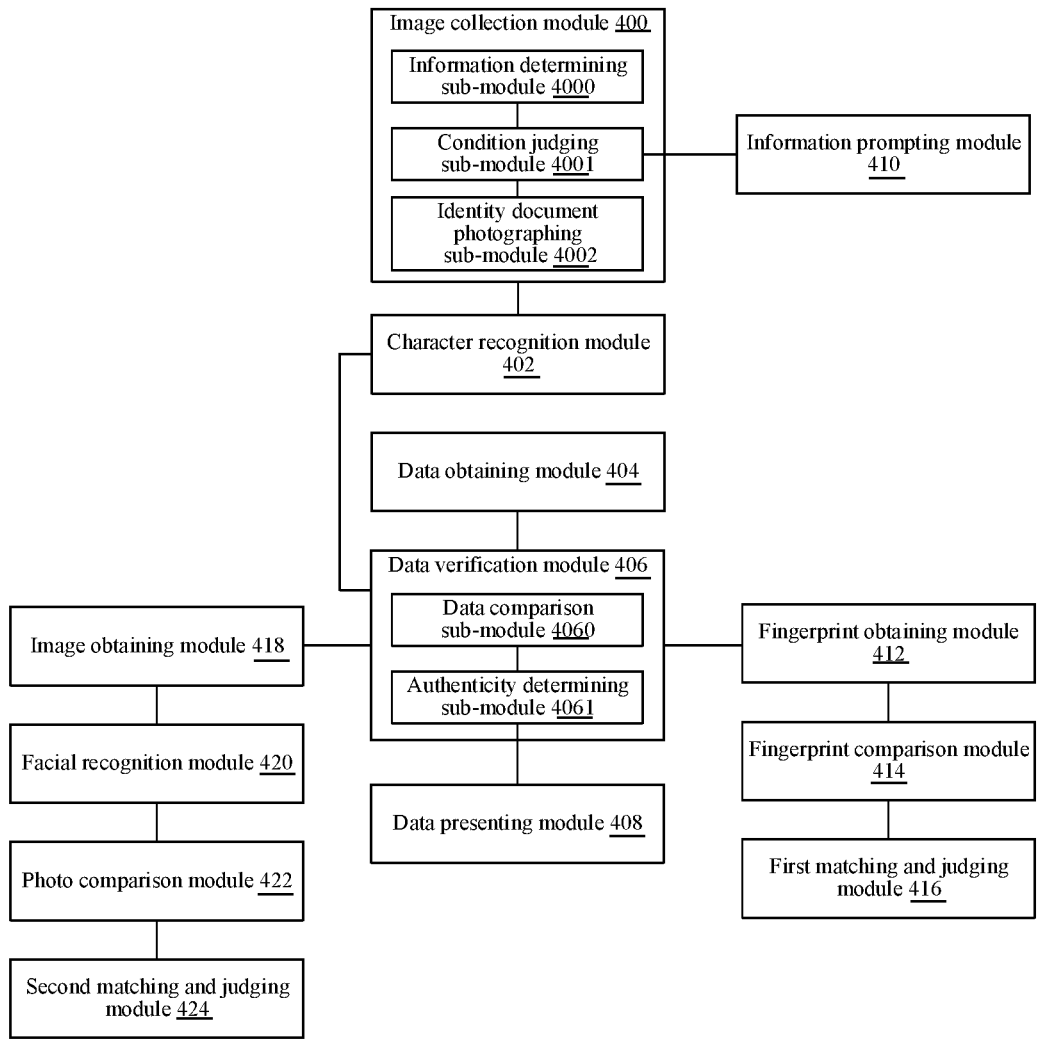
FIG. 4 is a structure block diagram of an apparatus for verifying an identity document according to embodiment IV of the present disclosure.

FIG. 4 illustrates a structure block diagram of an apparatus for verifying an identity document according to embodiment IV of the present disclosure.

The apparatus for verifying an identity document according to this embodiment of the present disclosure includes: an image collection module 400, configured to collect an identity document image of a current identity document by means of a first camera; a character recognition module 402, configured to recognize characters in the identity document image to obtain first identity document data; a data obtaining module 404, configured to obtain second identity document data of the identity document by means of an identity document reader; and a data verification module 406, configured to verify authenticity of the identity document according to the first identity document data and the second identity document data.

In other embodiments, the first identity document data at least includes one of the following data: name, gender, nationality, date of birth, residential address, citizen identification number, photo data, issuing authority information, validity period of the identity document, or the like; and the second identity document data at least includes one of the following data: name, gender, nationality, date of birth, residential address, citizen identification number, photo data, issuing authority information, validity period of the identity document, or the like. The data verification module 406 includes: a data comparison sub-module 4060, configured to perform comparison on corresponding data in the first identity document data and the identity document data; and an authenticity determining sub-module 4061, configured to determine the identity document to be true if the corresponding data in the first identity document data and the second identity document data are identical, and determine the identity document to be false if at least one corresponding data between the first identity document data and the second identity document data is different.

In other embodiments, the apparatus for verifying an identity document according to this embodiment of the present disclosure further includes: a data presenting module 408, configured to present a different data content of the corresponding data between the first identity document data and the second identity document data in response to the result that the authenticity determining sub-module 4061 determines that the identity document is false.

In other embodiments, the image collection module 400 includes: an information determining sub-module 4000, configured to determine position information and orientation information of the identity document; a condition judging sub-module 4001, configured to determine whether a photographing condition for the identity document is satisfied according to the position information and the orientation information; and an identity document photographing sub-module 4002, configured to collect the identity document image by photographing the identity document by means of the first camera if the photographing condition is satisfied.

In other embodiments, the condition judging sub-module 4001 is configured to determine whether a body of the identity document is completely located within a preset area according to the position information and whether a target surface of the identity document faces towards a first direction according to the orientation information, the first direction being configured to represent a direction pointing from the preset area to the first camera, and determine that the photographing condition for the identity document is satisfied if the body of the identity document is completely located within the preset area and the target surface faces towards the first direction.

In other embodiments, the condition judging sub-module 4001 is further configured to determine that the photographing condition for the identity document is not satisfied if the body of the identity document is completely located outside the preset area, or a part of the body of the identity document is located outside the preset area, or the target surface faces towards a second direction, where the first direction is different from the second direction.

In other embodiments, the target surface includes an identity document surface containing data to be compared.

In other embodiments, the apparatus for verifying an identity document according to this embodiment of the present disclosure further includes: an information prompt module 410, configured to generate and present prompt information for indicating an adjustment of the identity document if the photographing condition for the identity document is not satisfied.

In other embodiments, the second identity document data further includes fingerprint data. The apparatus for verifying an identity document according to this embodiment of the present disclosure further includes: a fingerprint obtaining module 412, configured to obtain fingerprint data of the target user in response to the identity document being determined to be true; a fingerprint comparison module 414, configured to compare the fingerprint data of the target user with fingerprint data in the second identity document data; and a first matching and judging module 416, configured to determine that the identity document matches with the target user if the fingerprint data of the target user is identical to the fingerprint data in the second identity document data.

In other embodiments, the first matching and judging module 416 is further configured to determine the identity document to be not matched with the target user if the fingerprint data of the target user is different from the fingerprint data in the second identity document data.

In other embodiments, the apparatus for verifying an identity document according to this embodiment of the present disclosure further includes: an image collection module 418, configured to collect a user image of the target user in response to the identity document being determined to be true; a facial recognition module 420, configured to obtain photo data of the target user by performing facial recognition on the user image; a photo comparison module 422, configured to separately compare the photo data of the target user with photo data in the first identity document data and photo data in the second identity document data; and a second matching and judging module 424, configured to determine that the identity document matches with the target user if the photo data of the target user is identical to the photo data in the first identity document data and the photo data in the second identity document data.

In other embodiments, the second matching and judging module 424 is further configured to determine that the identity document does not match with the target user if the photo data of the target user is different from both the photo data in the first identity document data and the photo data in the second identity document data.

The first camera and the identity document reader in the embodiment of the present disclosure may be disposed within the apparatus for verifying an identity document, or may be configured as independent third-party devices, and this is not limited in this embodiment of the present disclosure.

The apparatus for verifying an identity document according to this embodiment of the present disclosure is configured to implement the method for verifying an identity document according to the forgoing embodiments, and yields the corresponding effective effect of the method embodiments. Details are not described herein again.

Embodiment V

Figure 5:
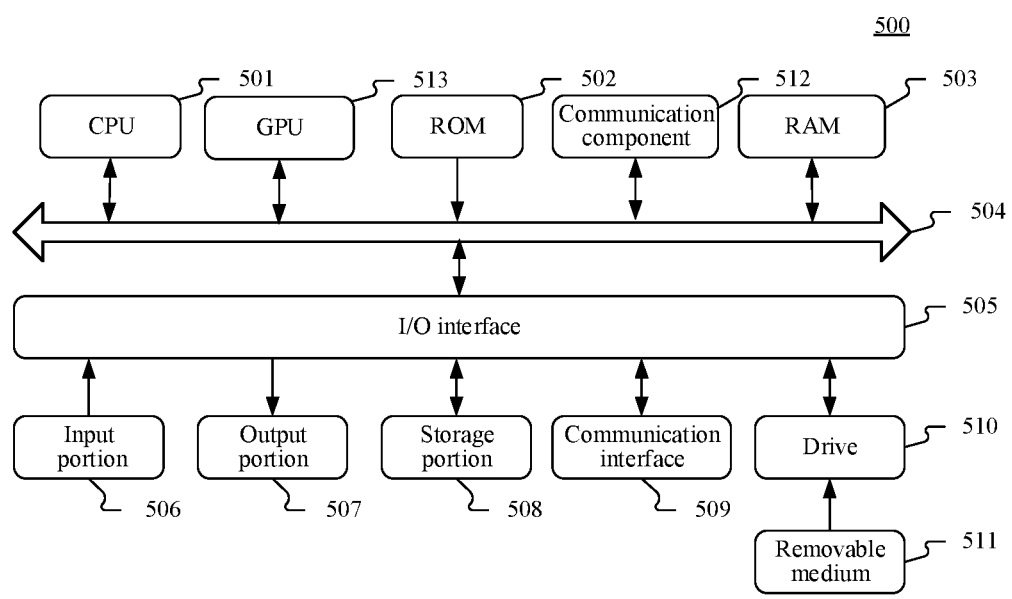
FIG. 5 is a structural schematic diagram of an electronic device according to embodiment V of the present disclosure.

This embodiment of the present disclosure further provides an electronic device, such as a mobile terminal, a Personal Computer (PC), a tablet computer, and a server. FIG. 5 illustrates a structural schematic diagram of an electronic device 500 used to implement the apparatus for verifying an identity document in the embodiments of the present disclosure. As is shown in FIG. 5, the electronic device 500 may include a memory and a processor. For example, the electronic device 500 includes one or more processors, a communication component, and the like. The one or more processors are, for example, one or more Central Processing Units (CPUs) 501 and/or one or more Graphic Processing Units (GPUs) 513, and the processors may execute an appropriate action and processing according to an executable instruction stored in a Read-Only Memory (ROM) 502 or an executable instruction loaded from a memory portion 508 to a Random-Access Memory (RAM) 503. The communication component includes a communication assembly 512 and/or a communication interface 509. The communication assembly 512 may include, but not limited to, a network card and the network card may include, but not limited to, an InfiniBand (IB) network card. The communication interface 509 includes a communication interface of a network interface card such as a LAN card and a modem, and the communication interface 509 performs communication processing via a network such as the Internet.

The processor may communicate with the ROM 502 and/or the RAM 503 to execute an executable instruction, is connected to the communication assembly 512 by means of a communication bus 504, and communications with another target device by means of the communication assembly 512, thereby completing the corresponding operations of any one of the method for verifying an identity document provided in the embodiments of the present disclosure, for example, collecting an identity document image of a current identity document by means of a first camera; recognizing characters in the identity document image to obtain first identity document data; obtaining second identity document data of the identity document by means of an identity document reader; and verifying authenticity of the identity document according to the first identity document data and the second identity document data.

In addition, the RAM 503 may further store programs and data required for operations of an apparatus. The CPU 501 or GPU 513, the ROM 502, and the RAM 503 are connected to each other by means of the communication bus 504. In the case that the RAM 503 exists, the ROM 502 is an optional module. The RAM 503 stores executable instructions, or writes the executable instructions into the ROM 502 during running, where the executable instructions cause the processor to execute corresponding operations of the foregoing communication method. An Input/output (I/O) interface 505 is also connected to the communication bus 504. The communication assembly 512 may be an integrated assembly, or may include multiple sub-modules (e.g., multiple IB network cards), and is linked with the communication bus.

The following components are connected to the I/O interface 505: an input portion 506 including a keyboard, a mouse and the like; an output portion 507 including a Cathode-Ray Tube (CRT), a Liquid Crystal Display (LCD), a loudspeaker and the like; a storage portion 508 including hardware and the like; and a communication interface 509 of a network interface card such as a LAN card and a modem. A drive 510 is also connected to the I/O interface 505 according to needs. A removable medium 511 such as a disk, an optical disk, a photo-magnetic disk and a semiconductor memory is installed on the drive 510 according to needs, to cause a computer program read from the removable medium 511 to be installed into the storage part 508 according to needs.

It should be noted that the architecture illustrated in FIG. 5 is merely an optional implementation mode. During specific practice, the number and types of the components in FIG. 5 may be selected, decreased, increased, or replaced according to actual requirements. Different functional components may be separated or integrated or the like. For example, the GPU and the CPU may be separated, or the GPU may be integrated on the CPU, and the communication component may be separated from or integrated on the CPU or the GPU or the like.

These alternative implementation modes all fall within the scope of protection of the present disclosure.

The electronic device according to this embodiment of the present disclosure can be configured to implement the method for verifying an identity document in the foregoing embodiments. Devices in the electronic device may be configured to execute steps in the foregoing method embodiments. For example, the method for verifying an identity document described above may be implemented by the processor of the electronic device invoking related instructions stored in the memory. For the purpose of concision, details are not described herein again.

Embodiment VI

According to this embodiment of the present disclosure, the process described in the reference flow chart above may be achieved as a computer program product. For example, this embodiment of the present disclosure includes a computer program product, which includes a computer program physically included in a machine readable medium, the computer program including program codes for executing the method illustrated in the flow chart, and the program codes including instructions for correspondingly executing steps of the method according to the embodiments of the present disclosure, for example, collecting an identity document image of a current identity document by means of a first camera; recognizing characters in the identity document image to obtain first identity document data; obtaining second identity document data of the identity document by means of an identity document reader; and verifying authenticity of the identity document according to the first identity document data and the second identity document data. In this embodiment, the computer program may be downloaded from a network by means of the communication component and installed, and/or be installed from the removable medium 511. When the computer program is executed by the processor, functions provided in the method according to the embodiments of the present disclosure are executed.

The methods, apparatuses, electronic devices and storage medium according to the embodiments of the present disclosure may be implemented in many manners. For example, the methods, apparatuses, electronic devices and storage medium according to the embodiments of the present disclosure may be implemented by using software, hardware, firmware, or any combination of software, hardware, and firmware. Unless otherwise specially stated, the foregoing sequences of steps of the methods are merely for description, and are not intended to limit the steps of the methods of the embodiments of the present disclosure. In addition, in some embodiments, the present disclosure may be implemented as programs recorded in a recording medium. The programs include machine readable instructions for implementing the methods according to the embodiments of the present disclosure. Therefore, the present disclosure further covers the recording medium storing the programs for performing the methods according to the embodiments of the present disclosure.

The descriptions of the embodiments of the present disclosure are provided for the purpose of examples and description, and are not intended to be exhaustive or limit the embodiments of the present disclosure to the disclosed form. Many modifications and changes are obvious to a person of ordinary skill in the art. The embodiments are selected and described to better describe a principle and an actual application of the embodiments of the present disclosure, and to make a person of ordinary skill in the art understand the present disclosure, so as to design various embodiments with various modifications applicable to particular use.

The invention claimed is:

1. A method for verifying an identity document, comprising:
   collecting, by a first camera, an identity document image of a current identity document;
   recognizing characters in the identity document image to obtain first identity document data;
   obtaining, by an identity document reader, second identity document data of the identity document; and
   verifying authenticity of the identity document according to the first identity document data and the second identity document data;
   wherein the first identity document data at least comprises one of the following data: name, gender, nationality, date of birth, residential address, citizen identification number, photo data, issuing authority information, or validity period of the identity document; the second identity document data at least comprises one of the following data: name, gender, nationality, date of birth, residential address, citizen identification number, photo data, issuing authority information, or validity period of the identity document; and
   said verifying the authenticity of the identity document according to the first identity document data and the second identity document data comprises:
   comparing corresponding data in the first identity document data and the second identity document data;
   determining the identity document to be true if the corresponding data in the first identity document data and the second identity document data are identical; and
   determining the identity document to be false if at least one corresponding data between the first identity document data and the second identity document data is different.

2. The method according to claim 1, further comprising:
   presenting a different data content of the corresponding data between the first identity document data and the second identity document data in response to the identity document being determined to be false.

3. The method according to claim 1, wherein the step of collecting, by the first camera, the identity document image of the current identity document comprises:
   determining position information and orientation information of the identity document;
   determining whether a photographing condition for the identity document is satisfied according to the position information and the orientation information; and
   obtaining, by the first camera, the identity document image by photographing the identity document if the photographing condition is satisfied.

4. The method according to claim 3, the step of determining whether the photographing condition for the identity document is satisfied according to the position information and the orientation information comprises:
  determining whether a body of the identity document is completely located within a preset area according to the position information and determining whether a target surface of the identity document faces towards a first direction according to the orientation information, the first direction being configured to represent a direction pointing from the preset area to the first camera; and
  determining that the photographing condition for the identity document is satisfied if the body of the identity document is completely located within the preset area and the target surface faces towards the first direction.

5. The method according to claim 4, further comprising:
  determining that the photographing condition for the identity document is not satisfied if the body of the identity document is completely located outside the preset area, a part of the body of the identity document is located outside the preset area, or the target surface faces towards a second direction, wherein the first direction is different from the second direction.

6. The method according to claim 4, wherein the target surface comprises an identity document surface containing data to be compared.

7. The method according to claim 3, further comprising:
  generating and presenting prompt information for indicating an adjustment of the identity document if the photographing condition is not satisfied.

8. The method according to claim 1, wherein the second identity document data further comprises fingerprint data; and the method further comprises:
  obtaining fingerprint data of a target user in response to the identity document being determined to be true;
  comparing the fingerprint data of the target user with fingerprint data in the second identity document data; and
  determining that the identity document match with the target user if the fingerprint data of the target user is identical to the fingerprint data in the second identity document data.

9. The method according to claim 8, further comprising:
  determining that the identity document does not match with the target user if the fingerprint data of the target user is different from the fingerprint data in the second identity document data.

10. The method according to claim 1, further comprising:
  collecting a user image of the target user in response to the identity document being determined to be true;
  obtaining photo data of the target user by performing facial recognition on the user image;
  separately comparing the photo data of the target user with photo data in the first identity document data and photo data in the second identity document data; and
  determining that the identity document matches with the target user if the photo data of the target user is identical to both the photo data in the first identity document data and the photo data in the second identity document data.

11. The method according to claim 10, further comprising:
  determining that the identity document does not match with the target user if the photo data of the target user is different from both the photo data in the first identity document data and the photo data in the second identity document data.

12. An apparatus for verifying an identity document, comprising:
  a processor;
  a memory for storing instructions executable by the processor;
  wherein the processor is configured to:
  collect an identity document image of a current identity document by means of a first camera;
  recognize characters in the identity document image to obtain first identity document data;
  obtain second identity document data of the identity document by means of an identity document reader; and
  verify authenticity of the identity document according to the first identity document data and the second identity document data;
  wherein the first identity document data at least comprises one of the following data: name, gender, nationality, date of birth, residential address, citizen identification number, photo data, issuing authority information, or validity period of the identity document; the second identity document data at least comprises one of the following data: name, gender, nationality, date of birth, residential address, citizen identification number, photo data, issuing authority information, or validity period of the identity document; and
  the processor is further configured to compare corresponding data in the first identity document data and the second identity document data; and
  the processor is further configured to determine the identity document to be true if the corresponding data in the first identity document data and the second identity document data are identical, and determine the identity document to be false if at least one corresponding data between the first identity document data and the second identity document data is different.

13. The apparatus according to claim 12, wherein the processor is further configured to:
  present a different data content of the corresponding data between the first identity document data and the second identity document data in response to the identity document being determined to be false.

14. The apparatus according to claim 12, wherein the processor is further configured to:
  determine position information and orientation information of the identity document;
  determine whether a photographing condition for the identity document is satisfied according to the position information and the orientation information; and
  obtain the identity document image by photographing the identity document by means of the first camera if the photographing condition is satisfied.

15. The apparatus according to claim 14, wherein the processor is further configured to determine whether a body of the identity document is completely located within a preset area according to the position information and determine whether a target surface of the identity document faces towards a first direction according to the orientation information, the first direction being configured to represent a direction pointing from the preset area to the first camera, and determine that the photographing condition for the identity document is satisfied if the body of the identity document is completely located within the preset area and the target surface faces towards the first direction.

16. The apparatus according to claim 15, wherein the processor is further configured to determine that the photographing condition for the identity document is not satisfied if the body of the identity document is completely located outside the preset area, a part of the body of the identity document is located outside the preset area, or the target surface faces towards a second direction, wherein the first direction is different from the second direction.

17. The apparatus according to claim 15, wherein the target surface comprises an identity document surface containing data to be compared.

18. A non-transitory computer readable storage medium having stored therein instructions for execution by a processor to cause operations of:
- collecting an identity document image of a current identity document;
- recognizing characters in the identity document image to obtain first identity document data;
- obtaining second identity document data of the identity document; and
- verifying authenticity of the identity document according to the first identity document data and the second identity document data;
- wherein the first identity document data at least comprises one of the following data: name, gender, nationality, date of birth, residential address, citizen identification number, photo data, issuing authority information, or validity period of the identity document; the second identity document data at least comprises one of the following data: name, gender, nationality, date of birth, residential address, citizen identification number, photo data, issuing authority information, or validity period of the identity document; and
- said verifying the authenticity of the identity document according to the first identity document data and the second identity document data comprises:
- comparing corresponding data in the first identity document data and the second identity document data;
- determining the identity document to be true if the corresponding data in the first identity document data and the second identity document data are identical; and
- determining the identity document to be false if at least one corresponding data between the first identity document data and the second identity document data is different.

* * * * *